(12) United States Patent
Ambrosi et al.

(10) Patent No.: US 9,133,957 B2
(45) Date of Patent: Sep. 15, 2015

(54) MAGNET VALVE FOR CONTROLLING A FLUID

(75) Inventors: Massimiliano Ambrosi, Benningen (DE); Elmar Vier, Freiberg A. N. (DE); Andreas Karl, Benningen/Neckar (DE); Andreas Lechler, Moeglingen (DE); Stephan Steingass, Bornheim (DE); Nicolas Houis, Bietigheim-Bissingen (DE); Jens Norberg, Stuttgart (DE); Gerhard Stokmaier, Markgroeningen (DE)

(73) Assignee: Robert Bosch GmbH, Stuttgart, DE (US)

( * ) Notice: Subject to any disclaimer, the term of this patent is extended or adjusted under 35 U.S.C. 154(b) by 34 days.

(21) Appl. No.: 13/984,049

(22) PCT Filed: Dec. 15, 2011

(86) PCT No.: PCT/EP2011/072912
§ 371 (c)(1),
(2), (4) Date: Oct. 14, 2013

(87) PCT Pub. No.: WO2012/107137
PCT Pub. Date: Aug. 16, 2012

(65) Prior Publication Data
US 2014/0027658 A1    Jan. 30, 2014

(30) Foreign Application Priority Data
Feb. 8, 2011 (DE) .......................... 10 2011 003 783

(51) Int. Cl.
*F16K 31/08* (2006.01)
*B60T 8/36* (2006.01)
(Continued)

(52) U.S. Cl.
CPC ................ *F16K 31/08* (2013.01); *B60T 8/363* (2013.01); *B60T 13/686* (2013.01); *B60T 15/028* (2013.01); *F16K 31/0696* (2013.01)

(58) Field of Classification Search
CPC ..... F16K 31/08; F16K 31/0696; B60T 8/363; B60T 13/686; B60T 15/028
USPC .............. 251/48, 50, 129.01, 129.07, 129.15; 303/119.2; 335/257, 279
See application file for complete search history.

(56) References Cited

U.S. PATENT DOCUMENTS 2,619,116 A * 11/1952 Ralston .......................... 335/257
4,634,096 A *  1/1987 Hara ................................ 251/50
(Continued)

FOREIGN PATENT DOCUMENTS

DE    10 2004 030 428 A1    1/2006
DE    10 2008 014 098 A1    5/2009
(Continued)

OTHER PUBLICATIONS

International Search Report corresponding to PCT Application No. PCT/EP2011/072912, mailed Feb. 28, 2012 (German and English language document) (7 pages).

*Primary Examiner* — John Bastianelli
(74) *Attorney, Agent, or Firm* — Maginot Moore & Beck LLP

(57) ABSTRACT

A magnet valve configured to control a fluid includes an armature with a base region, a casing region, and a head region. The magnet valve also includes a valve element that is connected to the armature and an armature housing component. A flow path is formed between the armature and the armature housing component. The flow path runs from a lower armature chamber to an upper armature chamber and back to the lower armature chamber. The head region of the armature has a flattened section, and the upper armature chamber is defined between the armature housing component and the flattened section. At least one groove is formed on the casing region of the armature starting from the base region. The at least one groove ends in the casing region before the flattened section of the head region.

5 Claims, 3 Drawing Sheets

(51) Int. Cl.
   *B60T 13/68* (2006.01)
   *B60T 15/02* (2006.01)
   *F16K 31/06* (2006.01)

(56) References Cited

U.S. PATENT DOCUMENTS

| | | | |
|---|---|---|---|
| 5,605,386 A * | 2/1997 | Ziegler et al. | 251/129.07 |
| 5,683,151 A * | 11/1997 | Friedow et al. | 303/119.2 |
| 5,722,633 A * | 3/1998 | Goossens et al. | 251/50 |
| 5,791,747 A * | 8/1998 | Sorensen et al. | 303/119.2 |
| 5,879,060 A * | 3/1999 | Megerle et al. | 251/129.02 |
| 6,644,623 B1 * | 11/2003 | Voss et al. | 251/129.01 |
| 6,739,571 B2 * | 5/2004 | Hironaka | 251/50 |
| 6,808,160 B2 * | 10/2004 | Hayakawa et al. | 251/129.15 |
| 7,040,594 B2 * | 5/2006 | Hironaka | 251/50 |
| 7,243,899 B2 * | 7/2007 | Acar et al. | 335/279 |
| 2009/0121541 A1 | 5/2009 | Lee et al. | |

FOREIGN PATENT DOCUMENTS

| | | |
|---|---|---|
| EP | 1 065 116 A2 | 1/2001 |
| JP | 2000-46227 A | 2/2000 |
| WO | 01/00473 A1 | 1/2001 |
| WO | 2006/056509 A1 | 6/2006 |

* cited by examiner

MAGNET VALVE FOR CONTROLLING A FLUID

This application is a 35 U.S.C. §371 National Stage Application of PCT/EP2011/072912, filed on Dec. 15, 2011, which claims the benefit of priority to Serial No. DE 10 2011 003 783.7, filed on Feb. 8, 2011 in Germany, the disclosures of which are incorporated herein by reference in their entirety.

The present disclosure concerns a normally closed magnet valve for controlling a fluid.

BACKGROUND

Such normally closed magnet valves for controlling a fluid are known from the prior art in various embodiments, in particular for example as outlet valves for antilock, traction and stability devices (ABS/TCS/ESP devices) in motor vehicles. These magnet valves have an armature which is arranged axially moveable in a valve housing. In certain operating ranges, because of the vibrations occurring, the magnet valves tends to produce undesirable noise effects due to the axial knocking of the armature on the valve housing.

SUMMARY

The magnet valve according to the disclosure for controlling a fluid with the features described below in contrast has the advantage that the tendency to vibration is substantially reduced by shaping of the armature. This is achieved according to the disclosure in that the magnet valve comprises an armature with a base region, a casing region and a head region, a valve element connected with the armature, and an armature housing component. Between the armature and the armature housing component here is formed a flow path which runs from a lower armature chamber to an upper armature chamber and back to the lower armature chamber. The head region has a flattened section, wherein the upper armature chamber is defined between the armature housing component and the flattened section. At least one groove is formed in the casing region of the armature, starting from the base region, which groove ends in the casing region before the flattened section of the head region. Thus on reset of the armature, a damping effect is achieved by the fluid in the upper armature chamber which significantly improves the hydraulic damping behavior of the magnet valve and guarantees reliable operating function with a significantly reduced noise development of the magnet valve.

The description below indicates preferred refinements of the disclosure.

According to a preferred embodiment of the disclosure, a transition region is arranged between the casing region and the head region, wherein the groove ends in the transition region. Further preferably the groove starting from the casing region ends in the first third of the transition region. Because of the targeted geometric configuration and the resulting effective flow cross sections between armature and armature housing component, a significantly improved hydraulic damping of the armature is achieved. The extent of hydraulic damping here depends on the selected geometric sizes of the differential cross section, the moistened periphery and the gap geometry/length.

Preferably a second groove is provided which lies opposite the first groove. This achieves a widened flow path with improved flow between the upper and lower armature chambers. The result is a reduction of the pressure predominating in the flow path and an increased flow speed, whereby a low-resistance flow course is achieved.

In a further advantageous embodiment of the disclosure the armature has a bell shape which promotes a present, low-resistance flow course from the lower armature chamber to the upper armature chamber and back to the lower armature chamber, and thus gives the armature a high strength with a high cold-forming capacity. Furthermore the armature housing component has a pot-like shape, from which a compact construction results with low installation volume which facilitates installation in the magnet valve.

According to a preferred embodiment of the disclosure, the armature has a second transition region which is arranged on the casing region. In a further advantageous embodiment of the disclosure the second transition region provides a stop on the armature housing component. On movement of the armature to the stop, a progressive gradation of the hydraulic damping is hereby achieved over the armature stroke, which rises until reaching the maximum stroke and particularly effectively damps the mechanical impact. Thus a noise development which is unacceptable for various applications can be avoided. The magnet valve can preferably be used as a control/outlet valve in antilock, traction and stability devices (ABS/TCS/ESP devices).

BRIEF DESCRIPTION OF THE DRAWINGS

Embodiment examples of the disclosure are described in detail below with reference to the enclosed drawing. In the drawing.

DETAILED DESCRIPTION

Figure 1:
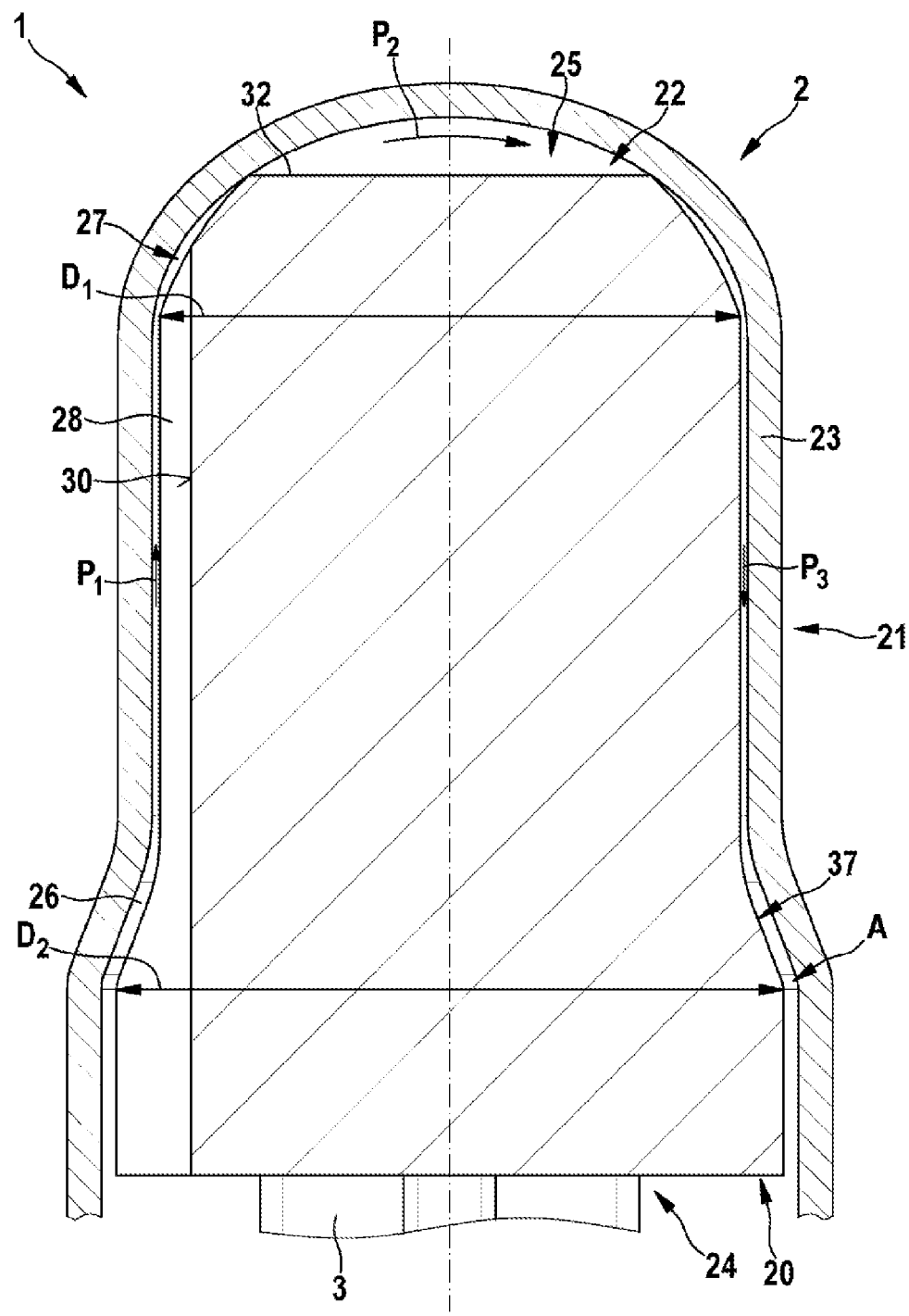
FIG. 1 shows a diagrammatic section view of an armature of a magnet valve for controlling a fluid according to a first embodiment example of the disclosure.
Figure 2:
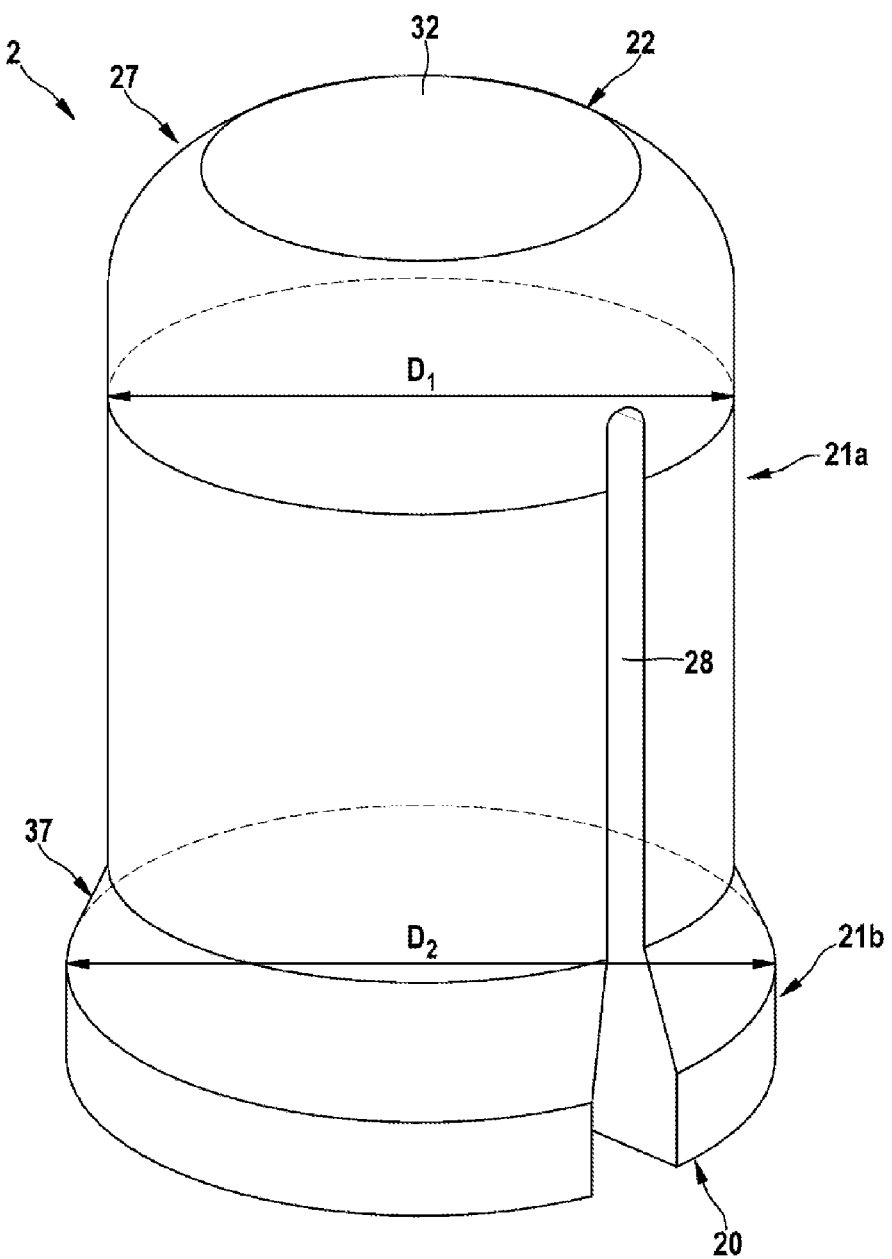
FIG. 2 shows a perspective view of the armature of the magnet valve of FIG. 1.

With reference to FIGS. 1 and 2, a magnet valve for controlling a fluid according to a first preferred embodiment example of the disclosure is described in detail below.

FIG. 1 shows a diagrammatic section view of an armature 2 of a magnet valve 1 for controlling a fluid according to the first embodiment example of the disclosure.

As evident from FIG. 1, the armature 2 has a base region 20, a casing region 21 and a head region 22 and is connected at the base region 20 with a valve element 3 of the magnet valve 1. The armature 2 is accommodated in an armature housing component 23. Between the armature 2 and the armature housing component 23 is formed a flow path 26. A flow course in the flow path 26 is marked with arrows P1, P2 and P3 and runs from a lower armature chamber 24 to an upper armature chamber 25 and back to the lower armature chamber 24. The head region 22 has a flattened section 32, wherein the upper armature chamber 25 is defined between the armature housing component 23 and the flattened section 32. A groove 28 is formed in the casing region 21 of the armature 2, starting from the base region 20. The groove 28 is for example formed as a V-groove with a base region 30. Between the head region 22 and the casing region 21 of the armature 2 is furthermore arranged a first transition region 27. As further evident from FIG. 1, the groove 28 ends in the transition region 27 before the flattened section 32 of the head region 22, preferably in the first third of the transition region 27.

As evident from FIG. 2, the armature 2 has a bell shape with the head region 22, the first transition region 27, a first casing region 21a, a second transition region 37, a second casing region 21b and the base region 20. The second casing region 21b here has a maximum diameter D2 which is greater than a maximum diameter D1 of the first casing region 21a (cf. FIG. 1). Also because of its tapering outer surface, the second transition region 37 provides a stop A on the armature housing component 23 (cf. FIG. 1). The shaping promotes a present, low-resistance flow course in the flow path 26 between the armature 2 and the armature housing component 23. Furthermore the armature 2 as a result has a particularly compact construction with minimum construction volume. Also a progressively rising hydraulic damping over the armature stroke is achieved, which on reaching the maximum stroke effectively damps the mechanical impact with substantially reduced noise development.

Figure 3:
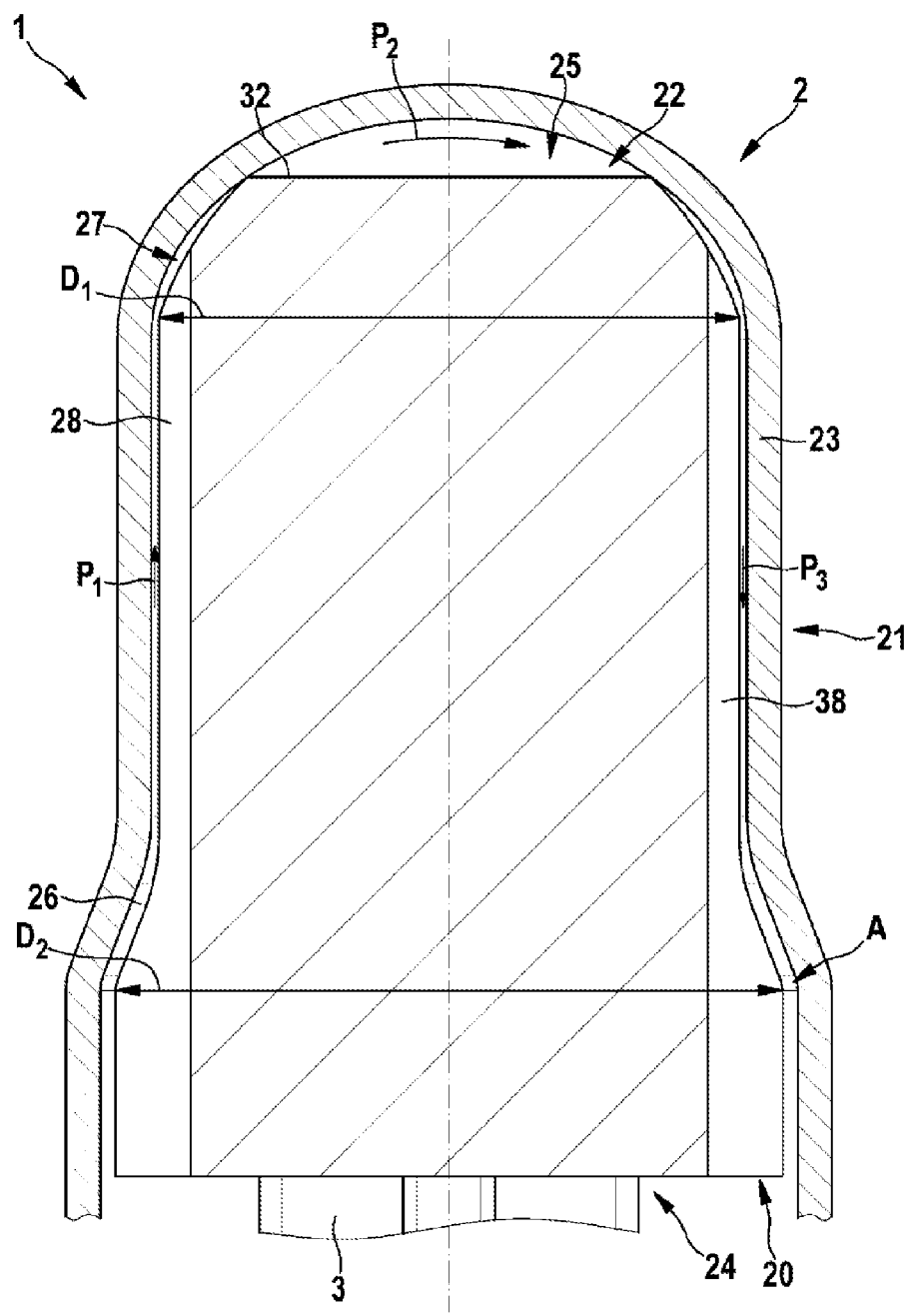
FIG. 3 shows a diagrammatic section view of an armature of a magnet valve for controlling a fluid according to a second embodiment example of the disclosure.

FIG. 3 shows a diagrammatic section view of the armature 2 of the magnet valve 1 according to a second embodiment example, wherein the same components or those with the same function carry the same reference numerals as in the first embodiment example.

In contrast to the first embodiment example, in this second embodiment example the armature 2 has a second groove 38 which is arranged opposite the first groove 28. Thus the flow path 26 is substantially widened between the armature housing component 23 (not shown here) and the armature 2, between the lower armature chamber 24 and the upper armature chamber 25, and a perceptibly improved flow through the armature 2 is achieved as the main part of the flow takes place through the grooves 28, 38.

The magnet valve 1 according to the disclosure in the embodiment examples described above has the advantage that by corresponding shaping or by the outer form of the armature 2, the susceptibility to vibration and the hydraulic damping are substantially improved. As well as a substantially reduced noise development, furthermore an improvement in the electromagnetic curve of the magnet valve 1 results therefrom which guarantees a more precise function accuracy of the magnet valve 1 in all operating points.

The invention claimed is:

1. A magnet valve for controlling a fluid, comprising:
    an armature with a base region, a casing region, a head region, and a transition region arranged between the casing region and the head region;
    a valve element connected with the armature; and
    an armature housing component,
    wherein a flow path formed between the armature and the armature housing component runs from a lower armature chamber to an upper armature chamber and back to the lower armature chamber,
    wherein the head region has a flattened section,
    wherein the upper armature chamber is defined between the armature housing component and the flattened section,
    wherein at least one groove is formed in the armature starting from the base region, extending through the casing region, and ending in a first third of the transition region as measured from an end of the transition region nearest the casing region.

2. The magnet valve as claimed in claim 1, wherein the at least one groove includes a first groove and a second groove defined opposite the first groove.

3. The magnet valve as claimed in claim 1, wherein the armature has a bell shape and the armature housing component has a pot-like shape.

4. The magnet valve as claimed in claim 1, wherein the at least one groove is a V-groove.

5. The magnet valve as claimed in claim 1, further comprising a second transition region arranged on the casing region.

* * * * *